United States Patent
Sumsion et al.

(10) Patent No.: US 9,055,156 B1
(45) Date of Patent: Jun. 9, 2015

(54) AUXILIARY SPEAKER AND MICROPHONE SYSTEM FOR CELLULAR PHONE

(71) Applicant: ZAGG Intellectual Property Holding Co., Inc., Salt Lake City, UT (US)

(72) Inventors: Cecily Sumsion, Draper, UT (US); Manuel Carreon, Lehi, UT (US); Paul Faerber, Pleasant Grove, UT (US); Joshual Kent Barnes, Roy, UT (US)

(73) Assignee: ZAGG Intellecutal Property Holding Co., Inc., Salt Lake City, UT (US)

( * ) Notice: Subject to any disclaimer, the term of this patent is extended or adjusted under 35 U.S.C. 154(b) by 0 days.

(21) Appl. No.: 14/660,706

(22) Filed: Mar. 17, 2015

(51) Int. Cl.
  *H04M 1/00* (2006.01)
  *H04M 9/00* (2006.01)
  *H04M 1/60* (2006.01)

(52) U.S. Cl.
  CPC .......... *H04M 1/6041* (2013.01); *H04M 1/6066* (2013.01)

(58) Field of Classification Search
  CPC .......... H04M 1/72522; H04M 1/6041; H04M 1/6066
  USPC ............... 379/420.01–420.04, 441, 446, 447, 379/454; 455/556.1, 556.2, 569.1
  See application file for complete search history.

(56) References Cited

U.S. PATENT DOCUMENTS

| | | | |
|---|---|---|---|
| 7,529,566 B2 | 5/2009 | Rodman et al. | |
| 7,623,352 B2 | 11/2009 | Boyd | |
| 7,957,771 B2 | 6/2011 | Frerking et al. | |
| 8,019,076 B1 | 9/2011 | Lambert | |
| 2005/0146227 A1 | 7/2005 | Jackson et al. | |
| 2007/0254695 A1* | 11/2007 | Langberg et al. | 455/556.1 |
| 2009/0209288 A1* | 8/2009 | Rofougaran | 455/556.1 |
| 2010/0081377 A1* | 4/2010 | Chatterjee et al. | 455/41.1 |

OTHER PUBLICATIONS

Jabra Speak 510 MS-USB VoIP desktop hands-free-bluetooth; accessed Mar. 12, 2015; 1 page; http://accessories.us.dell.com/sna/productdetail.aspx?c=us&l=en&s=&cs=04&sku=A6816604&ST=pla&dgc=ST&cid= 262075&lid=4742361&acd=1230980794501410.
Sennheiser SP20 Portable Conference Call USB Speakerphone ; accessed Mar. 12, 2015; 3 pages; http://www.staples.com/office/supplies/StaplesProductDisplay?storeId=10001&catalogIdentifier=2&partNumber=1178493&langid=1&cid=PS:GooglePLAs:1178493&ci_src=17588969&ci_sku=1178493&KPID=1178493&kpid=1178493&gclid=Cj0KEQiArK61BRC5-_jv48uxgrgBEiQAuxdZ9azWWj.
Logitech Mobile Speakerphone ; accessed Mar. 12, 2015; 7 pages; http://www.amazon.com/Logitech-Mobile-Speakerphone-P710e-Enterprise-Quality/dp/B00G57DFDG.
ErisStation® Conference Phone; accessedDec. 3, 2015; 2 pages; http://www.vtechphones.com/products/product_detail/2550?gclid=CjOKEQiAvKunBRCfsum9z6fu_5IBEiQAu4lg4ldKvwXmzHghOkBjtbP_EhSVMRydteEe3fbJfkszMaAtu98P8HAQ.

* cited by examiner

*Primary Examiner* — Tuan D Nguyen

(57) ABSTRACT

A supplemental speaker and microphone system for use with a cellular phone has a plug to connect to an audio socket of the cellular phone. A base of the system carries a speaker, a primary microphone and a primary transceiver. A pair of remote microphone pucks is removably disposed on the base, and each has a secondary microphone, a secondary transceiver, and a battery. The system converts the cellular phone into a conference phone without the need of wirelessly connecting the cellular phone to the system.

22 Claims, 8 Drawing Sheets

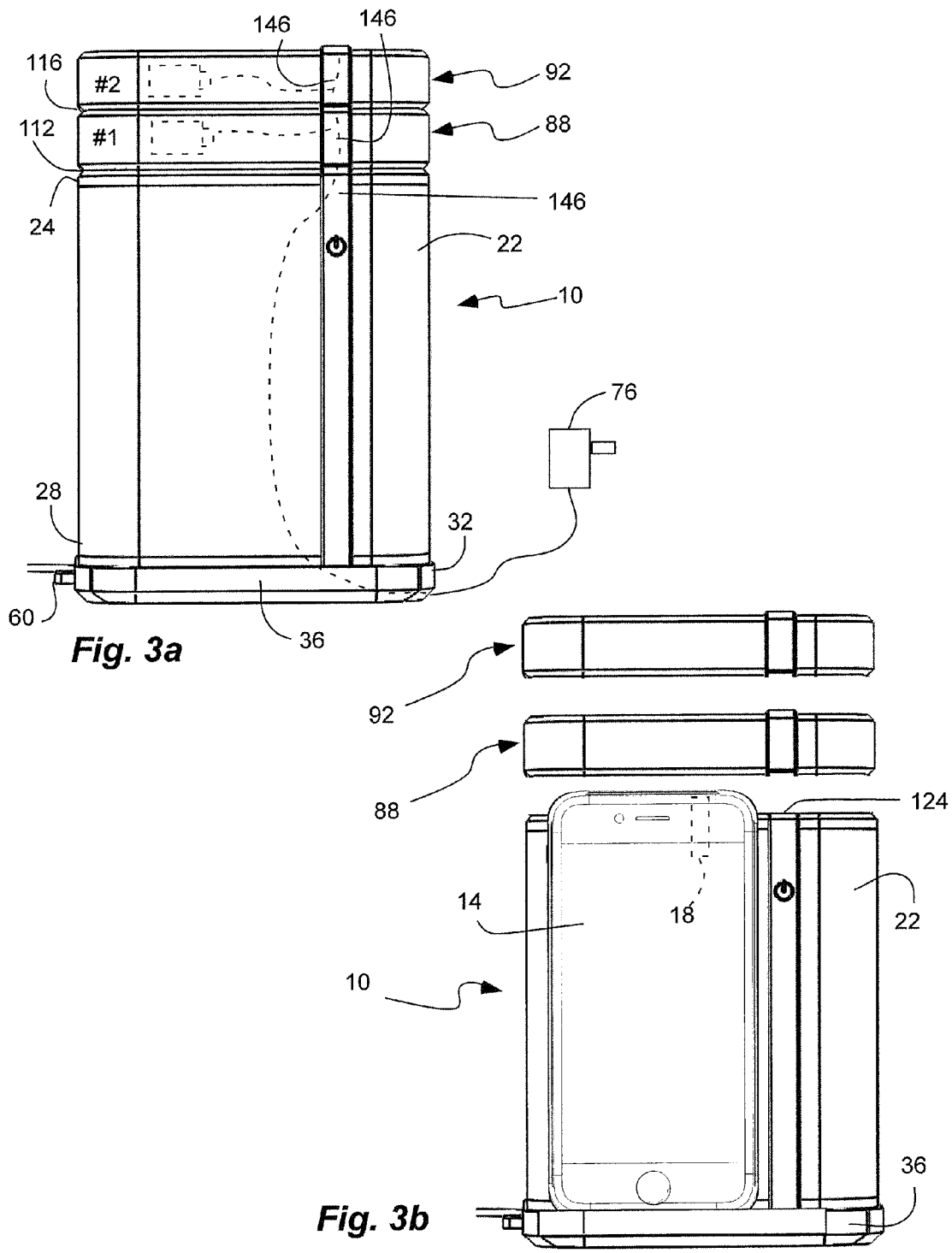

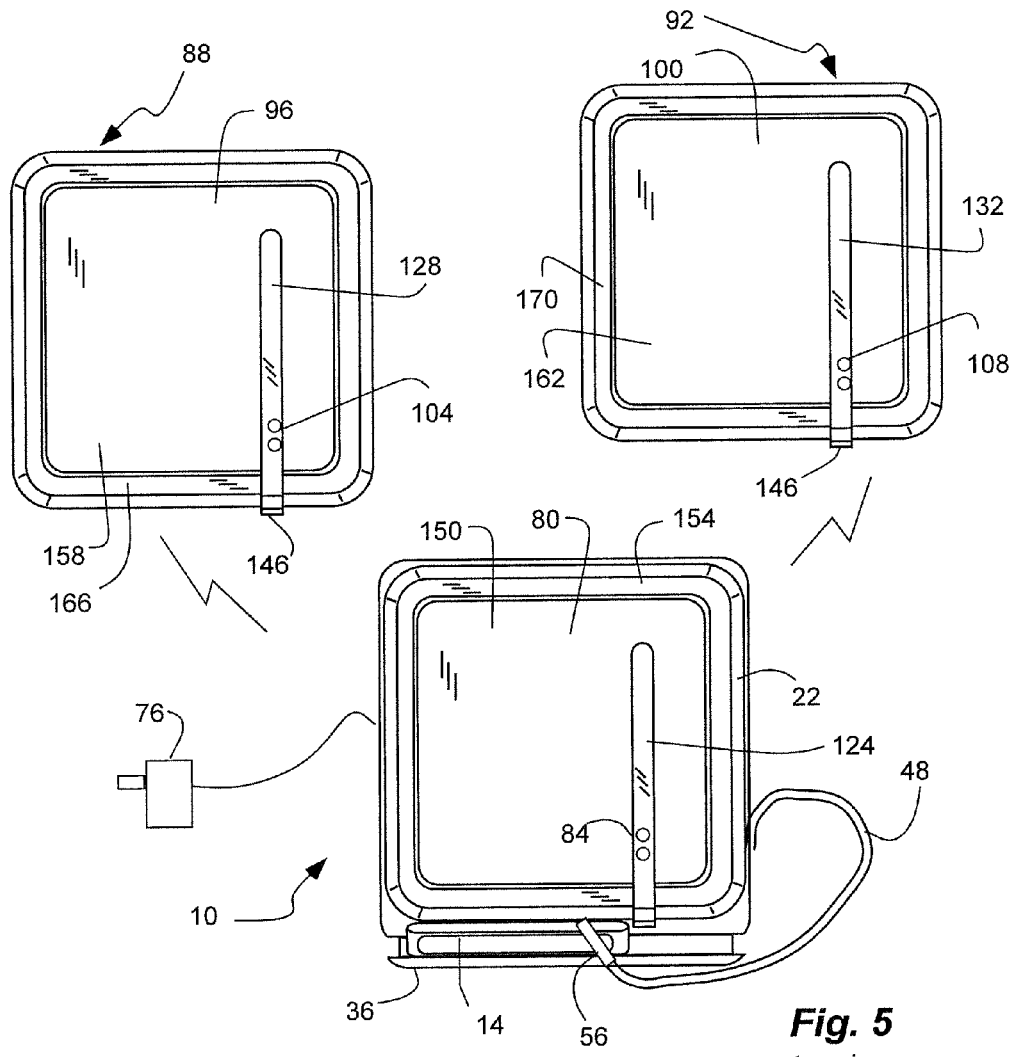
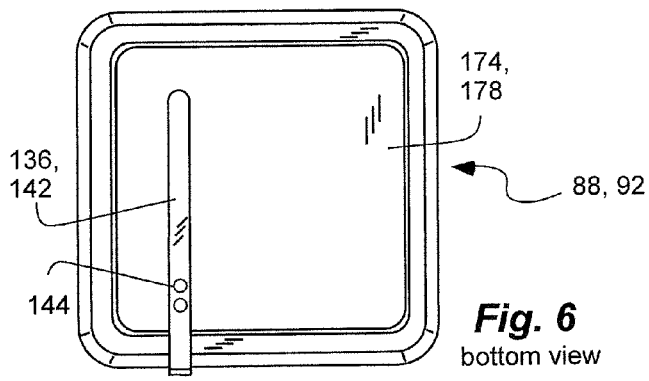
Fig. 5
top view
Fig. 6
bottom view

AUXILIARY SPEAKER AND MICROPHONE SYSTEM FOR CELLULAR PHONE

BACKGROUND

1. Field of the Invention

The present invention relates generally to an auxiliary speaker and microphone system for a cellular phone or the like.

2. Related Art

At times it can be desirable or necessary to include other people whom are present on a telephone conversation. Some phones have a speaker phone option which projects the sound, but often results in those present crowded around the phone and shouting into it. Conference phones can been developed which have a speaker and a microphone adapted for the purpose of being used by multiple people, but such conference phones can be expensive, and are typically limited to land lines, or hard wire telephone connections. One such conference phone has wireless microphones. See the Vtech® ErisStation® Conference Phone with Wireless Mics. External audio speakers have been developed that can plug into a headphone jack of a cellular phone to improve the audio output, but which do little to improve the microphone capabilities of the cellular phone. In addition, external audio speakers have been developed that can wirelessly connect to a cellular phone, such as with the Bluetooth standard, but which do little to improve the microphone capabilities of the cellular phone. An external audio speaker and microphone have been proposed that can couple to a cellular phone. See U.S. Pat. No. 8,019,076.

SUMMARY OF THE INVENTION

It has been recognized that it would be advantageous to develop an auxiliary speaker and microphone system for a cellular phone. In addition, it has been recognized that it would be advantageous to develop an auxiliary speaker and microphone system capable of converting a cellular phone into a conference phone, and capable of adapting to different room sizes and/or different number of attendees or participants.

The invention provides a supplemental speaker and microphone system configured for use with a cellular phone having an audio socket. The system comprises a base with a primary dock with a primary electrical connection, and a plug extending from the base to connect with the audio socket of the cellular phone. In addition, the system has a speaker carried by the base and operatively coupled to the plug, a primary microphone carried by the base and operatively coupled to the plug, a primary transceiver carried by the base and operatively coupled to the plug, and a power source electrically coupled to the speaker, the primary transceiver, and the primary electrical connection of the primary dock. A first remote puck is removable disposable on the primary dock. The first remote puck has a first remote microphone, a first remote transceiver operatively coupled to the first remote microphone, and a rechargeable battery. A bottom of the first remote puck is capable of mating with the primary dock of the base, and has a bottom electrical connection capable of electrically connecting to the primary electrical connection of the primary dock. A top of the first remote puck has a secondary dock and a secondary electrical connection. A pass-through electrical connection extends from the bottom electrical connection, through the puck, to the secondary electrical connection. A second remote puck is removable disposable on the secondary dock of the first remote puck. The second remote puck has a second remote microphone, a second remote transceiver operatively coupled to the second remote microphone, and a rechargeable battery. A bottom of the second remote puck is capable of mating with the secondary dock of the first remote puck, and has a bottom electrical connection capable of electrically connecting to the secondary electrical connection of the secondary dock of the first remote puck. The system has at least two configuration, including: 1) a use configuration in which: the plug is coupled to the audio socket of the cellular phone; and the first and second remote pucks are removed from the base and located remotely from the base; and 2) a charge configuration in which: the plug is uncoupled to the audio socket of the cellular phone; the first remote puck is disposed on the primary dock of the base; and the second remote puck is disposed on the secondary dock of the first remote puck (or the second remote puck is disposed on the primary dock of the base; and the first remote puck is disposed on a tertiary dock of the second remote puck).

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 3a is a front view of the supplemental speaker and microphone system of FIG. 1, and shown with the first remote microphone puck disposed on the base, and the second remote microphone puck disposed on the first remote microphone puck;

FIG. 3b is a front view of the supplemental speaker and microphone system of FIG. 1, shown with the first and second remote microphone pucks removed from the base, and the cellular phone carried by the base and disposed on a slidable shelf of the base;

FIG. 4a is a side view of the supplemental speaker and microphone system of FIG. 1, and shown with the second remote microphone puck disposed on the base, and the first remote microphone puck disposed on the second remote microphone puck, in a reverse configuration to that shown in FIG. 3a;

FIG. 5 is a top view of the supplemental speaker and microphone system of FIG. 1, shown with the first and second remote microphone pucks removed from the base, and the cellular phone carried by the base and disposed on the slidable shelf of the base;

FIG. 6 is a bottom view of either of the first or second remote microphone pucks of the supplemental speaker and microphone system of FIG. 1;

Figure 1A:
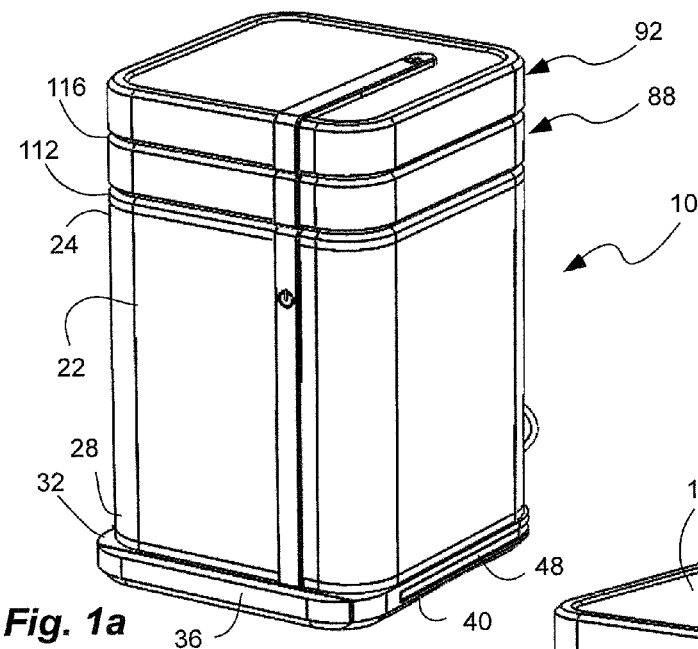
FIG. 1a is a perspective view of a supplemental speaker and microphone system in accordance with an embodiment of the present invention, shown with a pair of remote microphone pucks disposed on a base in a charge configuration.
Figure 1B:
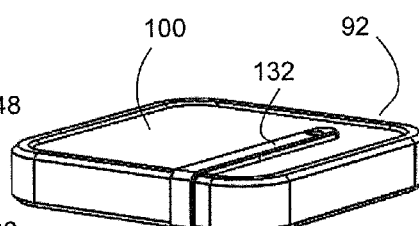
FIG. 1b is a perspective view of the supplemental speaker and microphone system of FIG. 1, shown with a second remote microphone puck removed from a first remote microphone puck.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The term "audio socket" is used herein to refer to a female socket of a headphone jack. The audio socket can have two, three or four contacts. The audio socket can also be configured for a microphone or microphone signal. Thus, the audio socket can be combination audio and microphone port. For example, the audio socket can be 3.5 mm headphone jack or socket, configured to receive the plug defined below.

The term "plug" is used herein to refer to a male pin of a headphone jack. The plug can have two (TS connector), three (TRS connector) or four contacts (TRRS connector). The plug can also be configured for a microphone or microphone signal. For example, the plug can be a 3.5 mm audio or phone connector.

The term "transceiver" is used herein to refer to a transmitter for transmitting a signal, a receiver for receiving a signal, or both a transmitter and a receiver. The transceiver can both send and receive, or can include a transmitter for transmitting a signal, and a receiver for receiving a signal.

The term "cellular phone" is used broadly herein to refer to any communication device with wireless communication capability, including for example, personal computers (PCs), digital music players (MP3 players), tablets or tablet computers, phablets, etc. Thus, the cellular phone or communication device can connect and communicate over a cellular network. In addition, the cellular phone or communication device can wirelessly couple to a wireless area network, which in turn can couple to a telephone network or line.

Description

As illustrated in FIGS. 1*a*-9, a supplemental speaker and microphone system, indicated generally at 10, in an example implementation in accordance with the invention is shown for use with a cellular phone 14 or the like. The supplemental speaker and microphone system 10 can be utilized as auxiliary speaker and microphone for a cellular phone, and can allow multiple people, attendees or participants, to participate (both listening and talking) in a telephone call on the cellular phone. Thus, the supplemental speaker and microphone system can convert the cellular phone into a conference phone without the need of wirelessly connecting the phone to the system. In addition, the supplemental speaker and microphone system can accommodate various sized rooms, and various numbers of people, attendees or participants. The supplemental speaker and microphone system can be plugged into the audio socket 18 or headphone jack (e.g. 3.5 mm headphone jack) of the cellular phone. The supplemental speaker and microphone system can amplify the audio signal from the cellular phone so that multiple people can listen to the conversation. In addition, the supplemental speaker and microphone system can have a microphone so that multiple people can talk during the conversation using the same cellular phone. Furthermore, the supplemental speaker and microphone system can have one or more remote microphone pucks that can be separated from the supplemental speaker and microphone system, and remotely located to pick up the conversation from the multiple people so that they do not have to shout, and/or so that they do not need to crowd around the cellular phone.

The supplemental speaker and microphone system 10 has a base 22 with a top 24 and a bottom 28. The bottom 28 of the base 22 can have a pedestal 32. The bottom 28 and/or pedestal 32 of the base can be disposed on a support surface, such as a desk or table. In one aspect, the body and pedestal can be a cube or cube-like, and can have four lateral sides with a square or substantially square horizontal cross-sectional shape (with rounded corners). In one aspect, the pedestal 32 can be wider and deeper (or larger) than the rest of the base, or the base above the pedestal; and thus the pedestal can have a larger horizontal cross-sectional shape. Thus, the larger pedestal can increase the stability of the base on the support surface. In one aspect, the base and pedestal can be formed of plastic, such as through injection molding, and can be substantially hollow, or can have a hollow or space therein. In another aspect, the base and/or pedestal can be formed of plastic, metal, fabric, etc. or combinations thereof.

Figure 4A:
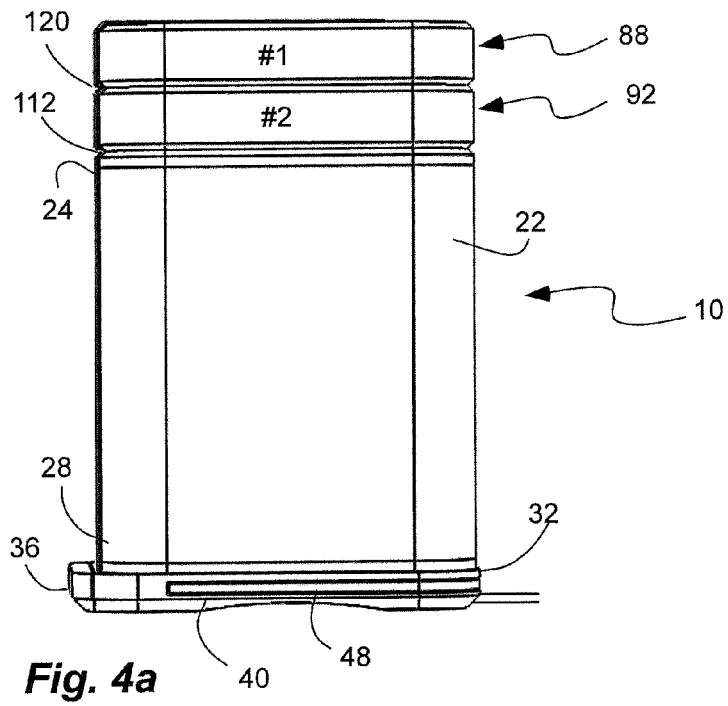
Figure 4B:
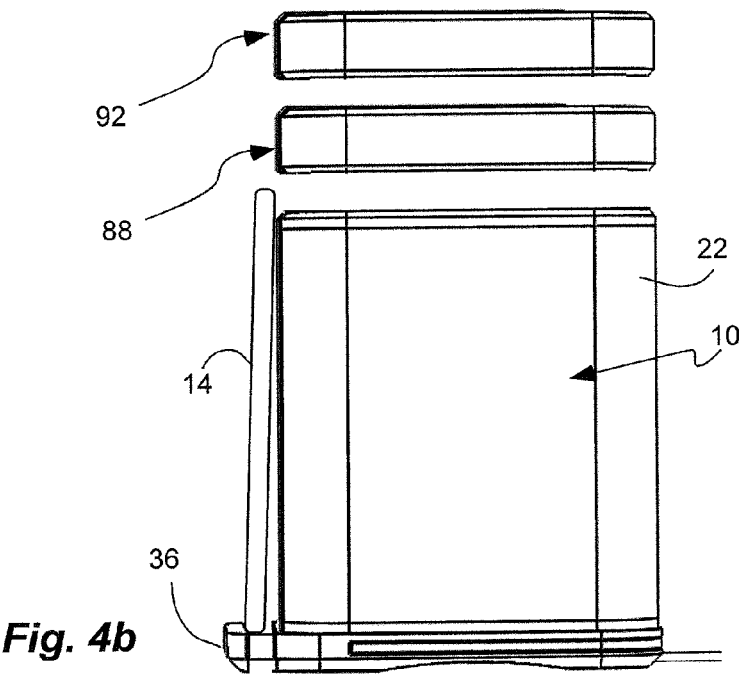
FIG. 4b is a side view of the supplemental speaker and microphone system of FIG. 1, shown with the first and second remote microphone pucks removed from the base, and the cellular phone carried by the base and disposed on the slidable shelf of the base.

A slidable shelf 36 can be slidably coupled to the pedestal 32 of the base 22. The shelf 36 can slide between a stored position (as shown in FIGS. 1*a*-3*a* and 4), in which at least a portion of the slidable shelf slides into the pedestal of the base; and an extended position (as shown in FIGS. 3*b*, 4*b*, 5 and 7), in which the at least a portion of the slidable shelf extends from the pedestal of the base, to receive the cellular phone 14 thereon. Thus, in use, the slidable shelf 36 can be slid outwardly to the extended position. Therefore, the base, pedestal and/or shelf 36 can carry the cellular phone 14 when in use. When not in use, the slidable shelf 36 can be slid or retracted to the stored position. Therefore, the shelf will not interfere with other desktop function when not in use. In one aspect, the shelf can have a non-slip surface to receive an edge of the cellular phone. In another aspect, the shelf can have a vertical lip on a distal free end of the shelf to further resist the cellular phone from slipping from the shelf. In another aspect, a bottom edge of the cellular phone can be placed upon the shelf, and a top, back edge of the cellular phone can rest against the base so that the cellular phone is inclined, but substantially vertically oriented (as shown in FIG. 4*b*). In another aspect, a side or top edge of the cellular phone can be placed upon the shelf. In another aspect, the cellular phone can be coupled to the base without being carried by the base, such as by being directly disposed on the support surface (as shown in FIG. 2*a*).

Figure 7:
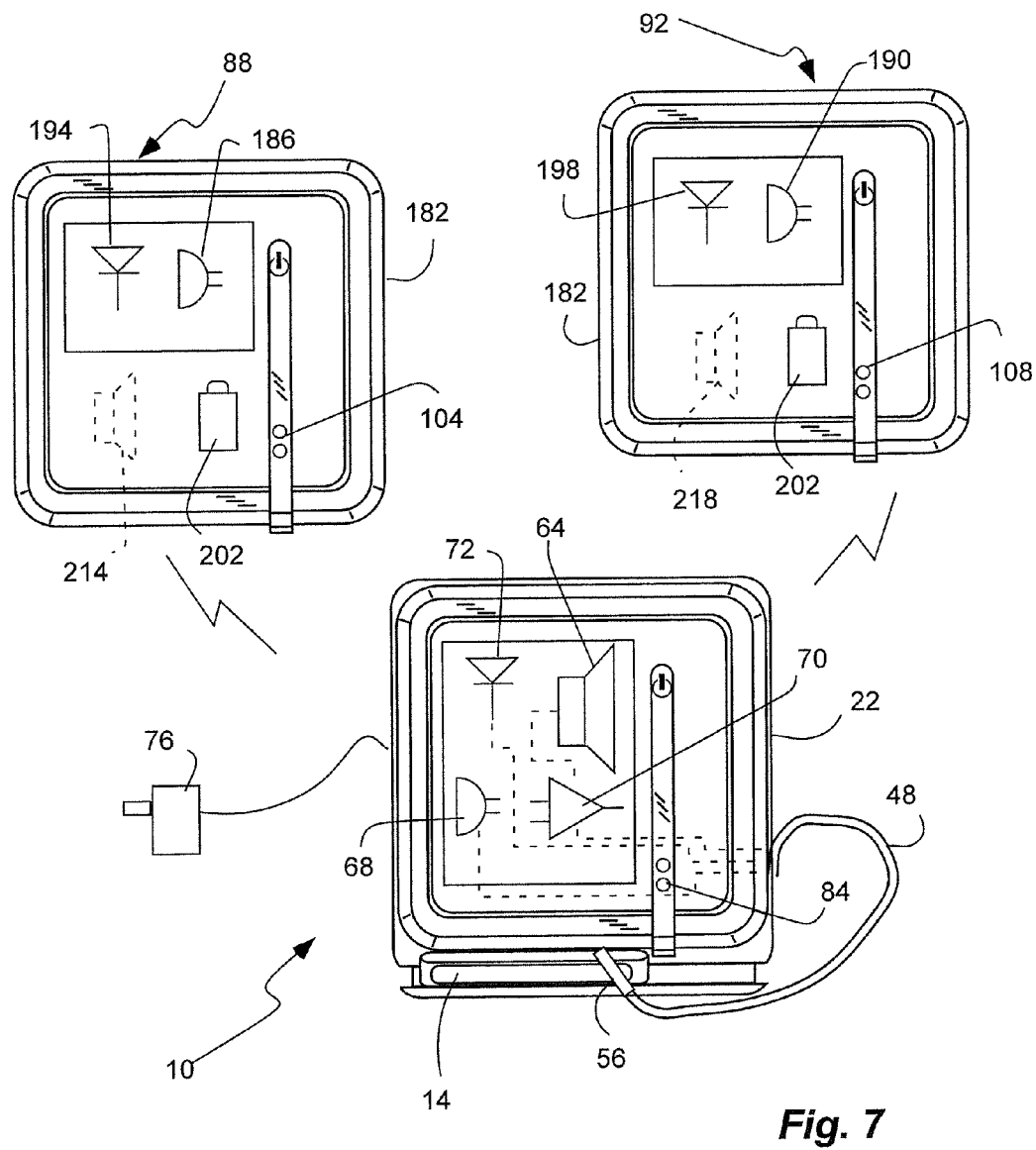
FIG. 7 is a top view of the supplemental speaker and microphone system of FIG. 1, shown with the first and second remote microphone pucks removed from the base, and the cellular phone carried by the base and disposed on the slidable shelf of the base.
Figure 8A:
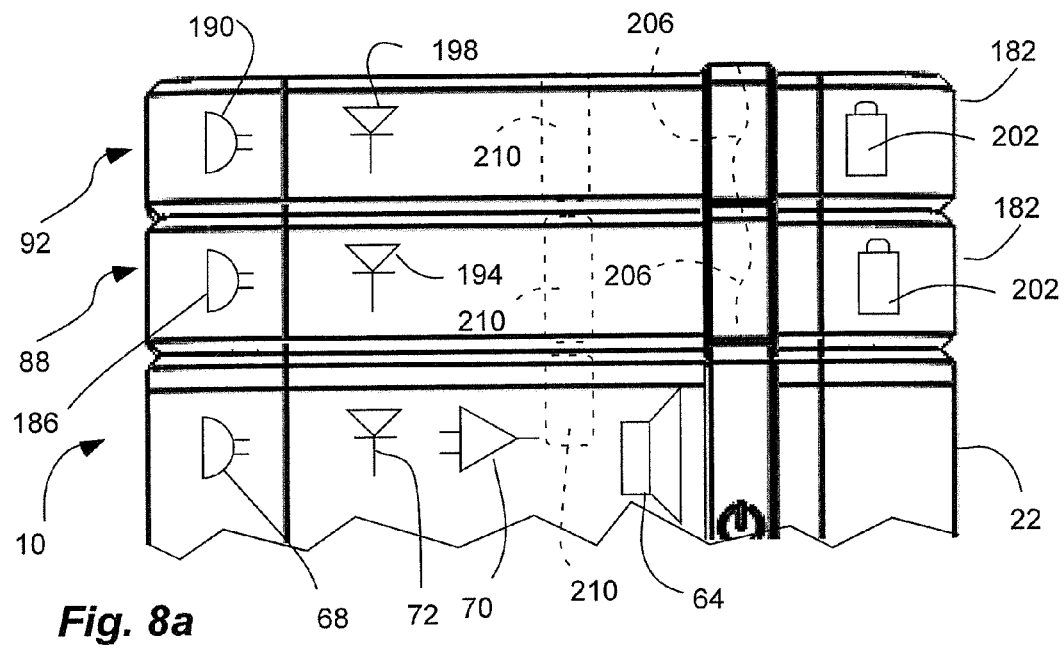
FIG. 8*a* is a partial front view of the supplemental speaker and microphone system of FIG. 1, shown with the first and second remote microphone pucks disposed on the base.
Figure 8B:
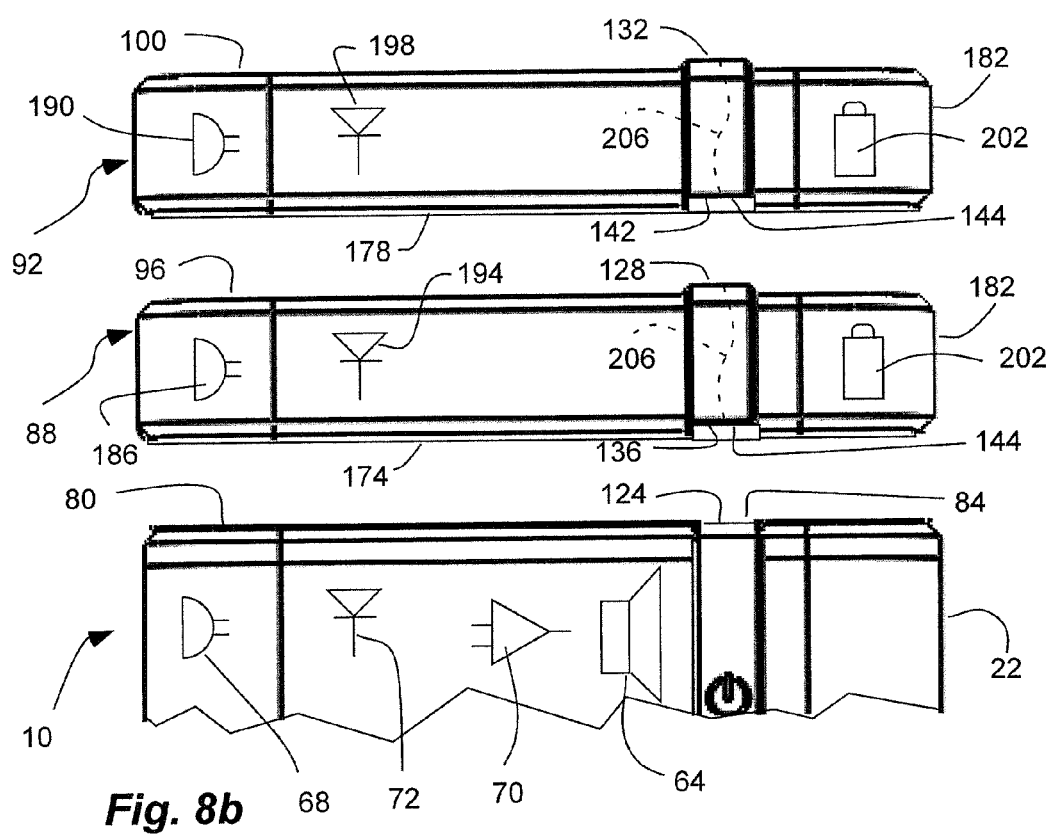
FIG. 8*b* is a partial front view of the supplemental speaker and microphone system of FIG. 1, shown with the first and second remote microphone pucks removed from the base.
Figure 9:
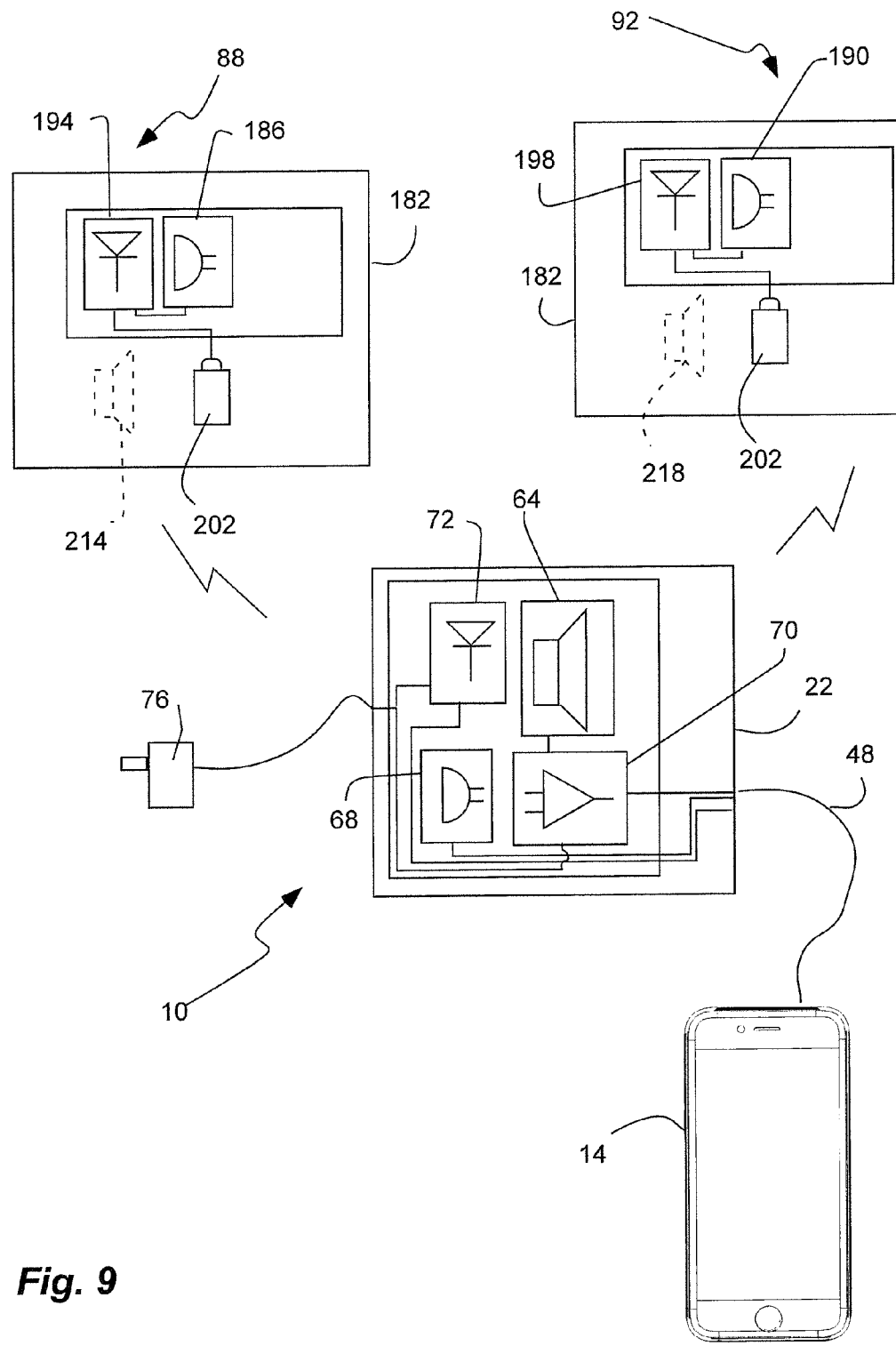
FIG. 9 is a schematic view of the supplemental speaker and microphone system of FIG. 1.

An elongated groove 40 can extend into a lateral side of the pedestal 32 of the base 22, and can extend horizontally around the pedestal. In one aspect, the groove 40 can circumscribe the pedestal except for the shelf 36. Thus, the groove 40 can extend around three of the four sides of the pedestal, while the shelf can extend on the fourth side. In one aspect, the elongated groove and the slidable shelf together circumscribe the pedestal of the base in series. In addition, a bore 44 (FIG. 2*a*) can be formed in one end of the elongated groove 40. A cord 48 can have a proximal end coupled to the base 22, and can extend to a distal free end. The cord 48 can be an electronic cord, capable of making an electrical connection and capable of carrying an audio signal. Thus, the cord can be an insulated wire. A plug 52 is coupled to the distal end of the cord 48, and is capable of mating with the audio socket 18 (FIG. 2*a*) of the cellular phone 14. In one aspect, the plug is a 3.5 mm audio or phone connector. The cord 48 is removably received in the elongated groove 40, and the plug 52 is removably received in the bore 44 (as shown in FIGS. 1*a*-1*c* and 3*a*-4*b*). The elongated groove 40 and the cord 48 can have substantially the same length so that the entire cord can be disposed in the groove. The plug 52 can have a plug body 56 with the cord 48 and the plug 52 extending therefrom perpendicularly with respect to one another. A tab 60 can extend from the plug body 56 opposite the plug 52, and can extend beyond the elongated groove 40 when the plug is received in the bore 44 (as shown in FIGS. 1*c*, 3*a* and 3*b*). Thus, the tab can facilitate removal of the plug 52 from the bore 44, and the cord 48 from the groove 40. The cord 48 and plug 52 can be removed from the groove 40 and the bore 44, respectively, during use (as shown in FIGS. 2*a*, 5 and 7).

The base 22 further has a speaker 64 and a primary microphone 68 carried by the base, and operatively coupled to the plug 52. The speaker and/or base can include an amplifier 70 and/or other control electronics. The speaker 64 and the microphone 68 can be disposed in the base, or in the hollow thereof. In addition, a primary transceiver 72 is carried by the base and operatively coupled to the plug 52. Furthermore, a power source 76 can be electrically coupled to the speaker 64 and the transceiver 72. (The power source 76 can also be electrically coupled to the primary dock and the primary electrical connection of the primary dock, as discussed below.) Thus, when the cellular phone 14 is coupled to the plug 52 and cord 48, the audio output from the cellular phone can be played by the speaker 64, and amplified by the amplifier 70, so that the audio output can be heard by multiple people in the vicinity of the base 22, or in the room with the base. In addition, when the cellular phone 14 is coupled to the plug 52 and cord 48, an audio signal from the microphone 68 in the base 22 can be input through the plug and cord to the cellular phone so that people in the vicinity of the base 22, or in the room with the base, can speak on the cellular phone as well as listen. In one aspect, the speaker, the primary microphone, the amplifier, and/or the primary transceiver can be included on one or more circuit boards disposed in and carried by the base.

The base 22 further has a primary dock 80 at the top 24 of the base with a primary electrical connection or contact 84. The power source 76 can be electrically coupled to the primary dock 80 and the primary electrical connection 80 of the primary dock.

First and second remote pucks 88 and 92 are removably disposed on the primary dock 80 on top of the base 22. In addition, the remote pucks 88 and 92 can be removably disposed with one atop another. Thus, the pucks can be stacked atop one another and the base. For example, the first remote puck 88 can be disposed on the primary dock 80, while the second remote puck 92 can be disposed on the first remote puck 88 (as shown in FIG. 3*a*). As another example, the second remote puck 92 can be disposed on the primary dock 80, while the first remote puck 88 can be disposed on the second remote puck 92 (as shown in FIG. 4*a*). Thus, a position and an order of the first and second remote pucks 88 and 92 on the primary dock 80 of the base 22 can be interchangeable. The first and second remote pucks 88 and 92 can have secondary and tertiary docks 96 and 100, respectively. The secondary dock 96 of the first puck 88 can receive the second remote puck 92 (as shown in FIG. 3*a*); while the tertiary dock 100 of the second puck 92 can receive the first remote puck 88 (as shown in FIG. 4*a*). The first and second remote pucks 88 and 92, and the secondary and tertiary docks 96 and 100, can have secondary and tertiary electrical connections or contacts 104 and 108, respectively (as shown in FIG. 5).

Figure 1C:
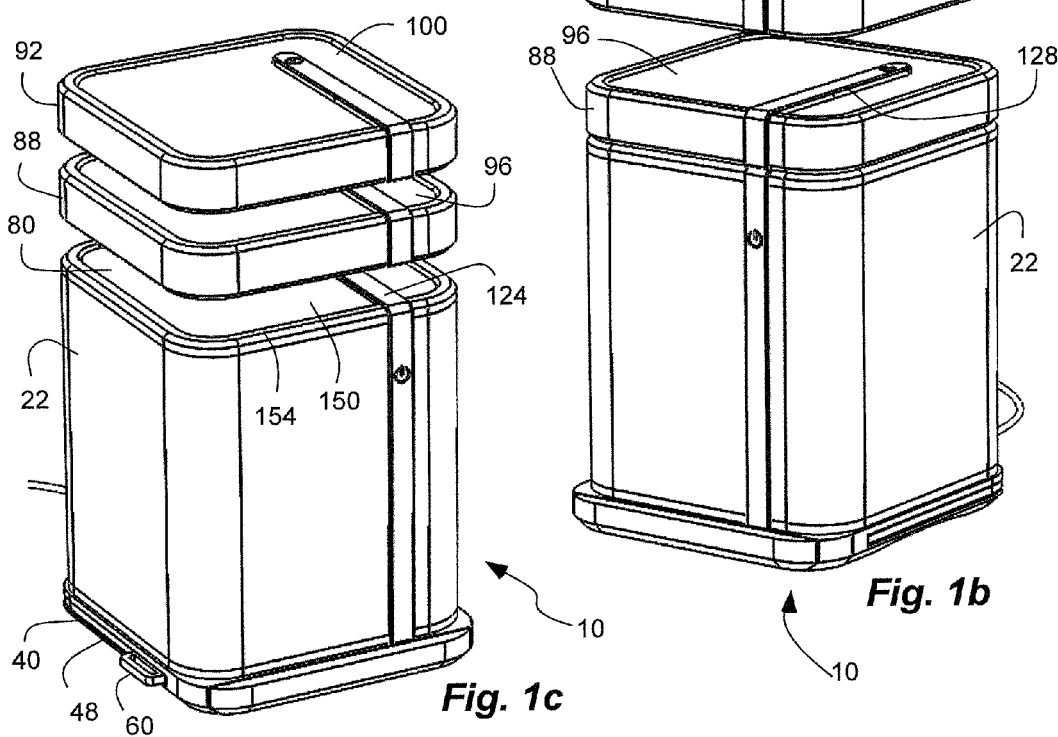
FIG. 1c is a perspective view of the supplemental speaker and microphone system of FIG. 1, shown with the first and second remote microphone pucks removed from the base.
Figure 2A:
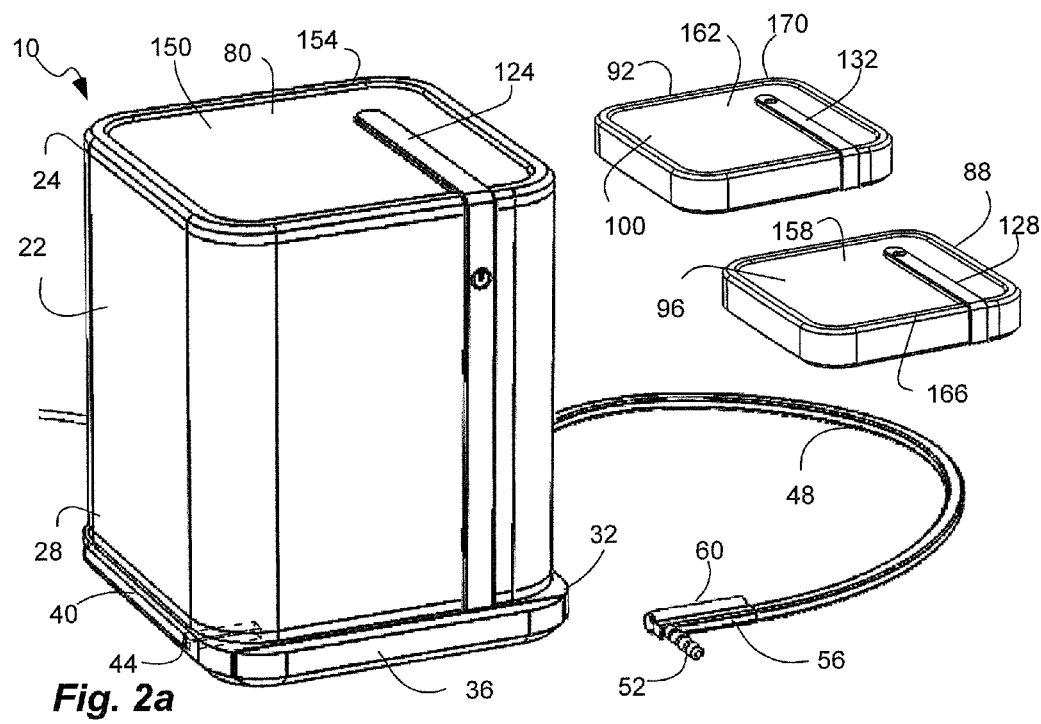
FIG. 2a is a perspective view of the supplemental speaker and microphone system of FIG. 1, shown with the first and second remote microphone pucks removed from the base, and a cord and a plug removed from a groove in the base.

A primary interface 112 can be formed between the primary dock 80 of the base 22 and a bottom of the first remote puck 88, or between the primary dock 80 of the base and a bottom of the second remote puck 90 (as shown in FIGS. 1*a* and 3*a*). A secondary interface 116 can be formed between the secondary dock 96 of the first remote puck 88 and the bottom of the second remote puck 92 (also as shown in FIGS. 1*a* and 3*a*). A tertiary interface 120 can be formed between the tertiary dock 100 of the second remote puck 92 and the bottom of the first remote puck 88 (as shown in FIG. 4*a*). The primary, secondary and tertiary interfaces can be the same so that the first remote puck 88 can be disposed on the base 22 with the second remote puck 92 disposed on the first remote puck 88; and the second remote puck 92 can be disposed on the base 22 with the first remote puck 88 disposed on the second remote puck 92.

The primary, secondary and tertiary interfaces 112, 116 and 120, and/or the primary, secondary and tertiary docks 80, 96 and 100, can have an elongated rib removably received in an elongated channel to facilitate alignment and/or retention between the pucks and the base, and the electrical connections. The base 22 and/or the primary dock 80 can have an elongated rib 124 extending from the top 24 of the base 22. The rib 124 can have or can carry the primary electrical connection or contact 84. Similarly, the first remote puck 88 and the second remote puck 92, and/or the secondary dock 96 and the tertiary dock 100, can have an elongated rib 128 and 132, respectively. The elongated ribs 128 and 132 can have or can carry the secondary and tertiary electrical connections or contacts 104 and 108, respectively. In addition, the primary, secondary and tertiary interfaces 112, 116 and 120, and/or bottoms of the first and second remote pucks 88 and 92, can have elongated channel 136 and 142, respectively, extending therein (as shown in FIG. 6). The channels 136 and 142 can have or can carry bottom electrical connections or contacts 144. The elongated ribs can be received in the elongated channels to help align the pucks with respect to the base and each other, and to connect the bottom electrical connection 144 in the channels 136 and 142 with the primary electrical connection or contact 84 of the base or rib 124, or the secondary and tertiary electrical connections or contacts 104 and 108 of the first and second pucks 88 and 92, or ribs 128 and 132 thereof. The elongated channels 136 and 142 of the first and second remote pucks 88 and 92 receive the elongated ribs 124, 128 and 132 of the base 22 or the second and first remote pucks 88 and 92, respectively. In one aspect, the rib 128 and the channel 136 of the first remote puck 88, and the rib 132 and the channel 142 of the second remote puck 92, can be aligned with respect to one another, and with the rib disposed over the channel. Thus, the rib of the puck gives a visual indication of the location of the corresponding channel when aligning the pucks with each other, or with the base. In another aspect, the ribs can extend both upwardly above the puck or the base, and laterally outwardly from a lateral side of the puck or the base. Thus, the ribs, or the lateral portions thereof, can form lateral alignment members 146 on lateral sides of the base, and the first and second remote pucks, that align with one another when the first remote puck is disposed on the base, and the second remote puck is disposed on the first remote puck. Thus, the lateral alignment members can further facilitate aligning the pucks with one another and the base.

In addition, the primary, secondary and tertiary interfaces 112, 116 and 120 and/or the primary, secondary and tertiary docks 80, 96 and 100 can further have an indentation and a mating protrusion. The base 22 and/or primary dock 80 can have an indentation 150 in the top 24 of the base 22. The indentation 150 can be surrounded by a perimeter lip 154 extending upwardly and circumscribing the indentation. Thus, the indentation can occupy a supper majority, or substantially all of the top of the base; while the perimeter lip can extend essentially around an entire perimeter of the top. Similarly, the first remote puck 88 and the second remote puck 92, and/or the secondary dock 96 and the tertiary dock 100, can have indentations 158 and 162, respectively, surrounded by perimeter lips 166 and 170, respectively. The first remote puck 88 and the second remote puck 92 have protrusions 174 and 178, respectively, (as shown in FIG. 6) extending from the bottoms thereof. The protrusion 174 and 178 of the first and second remote pucks 88 and 92 are received in the indentations 150, 158 and 162 of the base 22 or the second and first remote pucks 88 and 92, respectively.

The first and second remote pucks 88 and 92 can have bodies 182 that are substantially the same. In one aspect, the bodies can be formed of plastic, such as through injection molding, and can be substantially hollow, or can have a hollow or space therein. In another aspect, the bodies can be formed of plastic, metal, fabric, etc. or combinations thereof. First and second remote microphones 186 and 190 can be carried by the first and second remote pucks 88 and 92, respectively, or bodies thereof. The first and second remote pucks can be removed from the base and located remotely with respect to the base. Thus, the remote microphones 186 and 190 can be located remotely from the base. The remote microphones can pick up audio signals from people located away from the base so that people do not have to shout at the base, or crowd around the base, to be heard. First and second remote transceivers 194 and 198 can be operatively coupled to the first and second remote microphones 186 and 190, respectively, and carried by the first and second remote pucks 88 and 92, respectively, or bodies thereof. The first and second remote transceivers 194 and 198 are capable of wirelessly communicating with the primary transceiver 72 of the base 22, and thus the cellular phone 14 (via the cord and plug). In addition, rechargeable batteries 202 are electrically coupled to the first and second remote transceivers 194 and 198, and carried by the first and second remote pucks 88 and 92, or bodies thereof. Furthermore, pass-through electrical connections 206 can extend from the bottom electrical connections 144, through the pucks 88 and 92 or bodies thereof, to the secondary and/or tertiary electrical connections or contacts 104 and 108. Thus, power from the power source 76 can pass from the base 22 and the primary dock 80, and primary electrical connection 84 thereof, to the first remote puck 88 (and the battery 202 thereof) and bottom electrical connection 144 thereof, and through the pass-through electrical connection 206 to the secondary dock 96 and secondary electrical connection or contact 104 to the secondary puck 92 (and the battery 202 thereof) and the bottom electrical connection 144 thereof.

As described above, the first and second remote pucks 88 and 92 or bodies 182 thereof can have bottoms capable of mating with the primary dock 80 of the base 22, and can have a bottom electrical connection 144 capable of electrically connecting to the primary electrical connection 84 of the primary dock when disposed on the primary dock 80. As described above, the channels 136 and 142 can align with the rib 124 to align the electrical connections. In one aspect, the electrical connections can be carried by the rib and channels. In another aspect, the electrical connections can be separate from the rib and channels, such as on a top surface of the base or primary dock, and a bottom surface of the pucks. The elongated channel 136 or 142 of the first and second remote pucks 88 and 92 separately receive the elongated rib 124 of the base 22. In addition, the elongated channel 136 or 142 of the first and second remote pucks 88 and 92 separately receive the elongated rib 128 or 132 of the second and first remote puck.

As described above, the primary interface 112 is formed between the primary dock 80 of the base 22 and the bottom of the first remote puck 88 (as shown in FIG. 3a), or between the primary dock 80 of the base 22 and the bottom of the second remote puck 92 (as shown in FIG. 4a). The secondary interface 116 is formed between the secondary dock 96 of the first remote puck 88 and the bottom of the second remote puck 92 (as shown in FIG. 3a). The tertiary interface 120 is formed between the tertiary dock 100 of the second remote puck 92 and the bottom of the first remote puck 88 (as shown in FIG. 4a). The primary, secondary and tertiary interfaces are the same so that the first remote puck 88 can be disposed on the base 22 with the second remote puck 92 disposed on the first remote puck 88 (as shown in FIG. 3a), and the second remote puck 92 can be disposed on the base 22 with the first remote puck 88 disposed on the second remote puck 92 (as shown in FIG. 4a). Thus, the pucks can be simply and easily charged without regard to order.

Figure 2B:
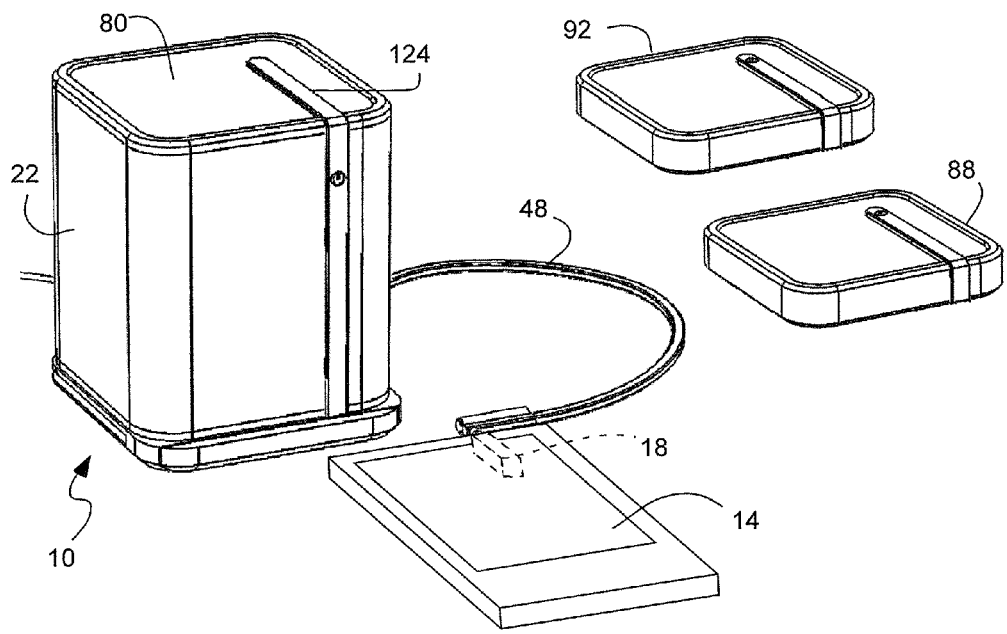
FIG. 2b is a perspective view of the supplemental speaker and microphone system of FIG. 1, shown with the first and second remote microphone pucks removed from the base, and the plug coupled to a cellular phone.

The supplemental speaker and microphone system 10, and the base 22 and remote pucks 88 and 92, can have multiple, and at least two, configuration, including: 1) a use configuration (FIGS. 2a, 2b, 5, 7, 8b and 9), and 2) a charge configuration (FIGS. 1a, 3a, 4a and 8a). In the use configuration, the plug 52 is coupled to the audio socket 18 of the cellular phone 14 (as shown in FIGS. 2b, 5 and 7). In addition, the first and second remote pucks 88 and 92 are removed from the base 22, and located remotely from the base. In the charge configuration, the plug 52 is uncoupled from the audio socket 18 of the cellular phone 14. In addition, the first remote puck 88 is disposed on the primary dock 80 of the base 22, and the second remote puck 92 is disposed on the secondary dock 96 of the first remote puck 88 (or the second remote puck 92 is disposed on the primary dock 80 or the base 22, and the first remote puck 88 is disposed on the tertiary dock 100 of the second remote puck 92). In the charge configuration, the batteries 202 of the remote pucks 88 and 92 are coupled to the power source 76 via the primary dock 80 and primary electrical connection 84, and the secondary dock 96 and the secondary electrical connection 104 (through the pass-through electrical connection 206), or the tertiary dock 100 and the tertiary electrical connection 108 (through the pass-through electrical connection 206). In one aspect, or a charge and use configuration, the system can be used with the plug 52 coupled to the audio socket 18 of the cellular phone 14, and the first and second remote pucks 88 and 92 are disposed on the base 22 and one another, and the batteries 202 of the remote pucks 88 and 92 are coupled to the power source 76, as described above. Thus, the pucks can be charged while the plug 52 is coupled to the audio socket 18 of the cellular phone 14. In another aspect, the system can be used with the plug 52 coupled to the audio socket 18 of the cellular phone 14, and one or more pucks disposed on the base, and one or more pucks removed from the base and located remotely from the base.

In one aspect, the base 22 and the bodies 182 of the first and second remote pucks 88 and 92 can be horizontally coextensive. In addition, the base 22 and the first and second remote pucks 88 and 92 can have vertical profiles that are substantially the same. Thus, an outer perimeter of the base and bodies are substantially the same shape and size. Therefore, the remote pucks do not interfere with other functions of the support surface.

In another aspect, the primary, secondary and tertiary interfaces 112, 116 and 120 and/or the primary, secondary and tertiary docks 80, 96 and 100 and/or the base 22 and remote pucks 88 and 92 can further have one or more magnets 210 located to magnetically coupled the first or second remote puck to the primary dock of the base, and the first and second remote pucks. The magnets can help align the pucks and the base, and can help maintain the connection.

In another aspect, the first and second remote pucks 88 and 92 can further comprise and carry first and second remote speakers 214 and 218, respectively, that are operatively coupled to the first and second transceivers 194 and 198, respectively.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A supplemental speaker and microphone system configured for use with a cellular phone having an audio socket, the system comprising:
   a) a base with a top;
   b) a primary dock at the top of the base with a primary electrical connection;
   c) a plug extending from the base and being capable of mating with the audio socket of the cellular phone;
   d) a speaker carried by the base and operatively coupled to the plug;
   e) a primary microphone carried by the base and operatively coupled to the plug;
   f) a primary transceiver carried by the base and operatively coupled to the plug;
   g) a power source electrically coupled to the speaker, the primary transceiver, and the primary electrical connection of the primary dock;
   h) a first remote puck removable disposable on the primary dock and having:
      i) a first remote microphone carried by the first remote puck,
      ii) a first remote transceiver operatively coupled to the first remote microphone and carried by the first remote puck, and capable of communicating with the primary transceiver of the base, and thus the cellular phone,
      iii) a rechargeable battery electrically coupled to the first remote transceiver and carried by the first remote puck,
      iv) a bottom capable of mating with the primary dock of the base and having a bottom electrical connection capable of electrically connecting to the primary electrical connection of the primary dock when the first remote puck is disposed on the primary dock,
      v) a top with a secondary dock and a secondary electrical connection, and
      vi) a pass-through electrical connection extending from the bottom electrical connection, through the puck, to the secondary electrical connection;
   i) a second remote puck removable disposable on the secondary dock of the first remote puck, and having:
      i) a second remote microphone carried by the second remote puck,
      ii) a second remote transceiver operatively coupled to the second remote microphone and carried by the second remote puck, and capable of communicating with the primary transceiver of the base, and thus the cellular phone,
      iii) a rechargeable battery electrically coupled to the second remote transceiver and carried by the second remote puck, and
      iv) a bottom capable of mating with the secondary dock of the first remote puck and having a bottom electrical connection capable of electrically connecting to the secondary electrical connection of the secondary dock of the first remote puck when the second remote puck is disposed on the secondary dock of the first remote puck;
   k) the system having at least two configuration, including:
      i) a use configuration in which:
         A) the plug is coupled to the audio socket of the cellular phone; and
         B) the first and second remote pucks are removed from the base and located remotely from the base; and
      ii) a charge configuration in which:
         A) the plug is uncoupled to the audio socket of the cellular phone;
         B) the first remote puck is disposed on the primary dock of the base; and
         C) the second remote puck is disposed on the secondary dock of the first remote puck.

2. The system in accordance with claim 1, wherein the base and the first and second remote pucks have bodies that are horizontally coextensive.

3. The system in accordance with claim 1, wherein the base and the first and second remote pucks have vertical profiles that are the same.

4. The system in accordance with claim 1, further comprising:
   lateral alignment members on lateral sides of the base, and the first and second remote pucks, and aligning with one another when the first remote puck is disposed on the base, and the second remote puck is disposed on the first remote puck.

5. The system in accordance with claim 1, further comprising:
   a slidable shelf slidably coupled to the base and slidable between a stored position in which at least a portion of the slidable shelf slides into the base, and an extended position in which the at least a portion of the slidable shelf extends from the base to receive the cellular phone thereon.

6. The system in accordance with claim 1, further comprising:
- an elongated groove extending into a lateral side of the base and removably receiving a majority of a cord coupled to the plug; and
- a bore in the elongated groove and removably receiving the plug.

7. The system in accordance with claim 6, further comprising:
- a tab extending from the plug, and extending beyond the elongated groove when the plug is received in the bore.

8. The system in accordance with claim 1, further comprising:
- a) a pedestal at a bottom of the base;
- b) a slidable shelf slidably coupled to the pedestal of the base and slidable between a stored position in which at least a portion of the slidable shelf slides into the pedestal of the base, and an extended position in which the at least a portion of the slidable shelf extends from the pedestal of the base to receive the cellular phone thereon;
- c) an elongated groove extending into a lateral side of the pedestal of the base;
- d) a bore in the elongated groove;
- e) a cord coupled to the base, and coupling the plug to the base;
- f) the cord being removably received in the elongated groove, and the plug being removably received in the bore;
- g) the elongated groove and the cord having substantially the same length; and
- h) the elongated groove and the slidable shelf together circumscribing the pedestal of the base in series.

9. The system in accordance with claim 1, further comprising:
- a plug body having a cord and the plug extending therefrom perpendicularly with respect to one another; and
- a tab extending from the plug body opposite the plug.

10. The system in accordance with claim 1, wherein a position and an order of the first and second remote pucks on the base are interchangeable, and wherein the second remote puck further comprises:
- a top with a tertiary dock and a tertiary electrical connection, and
- a pass-through electrical connection extending from the bottom electrical connection, through the puck, to the tertiary electrical connection.

11. The system in accordance with claim 10, further comprising:
- a) a primary interface formed between the primary dock of the base and the bottom of the first remote puck, or between the primary dock of the base and the bottom of the second remote puck;
- b) a secondary interface formed between the secondary dock of the first remote puck and the bottom of the second remote puck;
- c) a tertiary interface formed between the tertiary dock of the second remote puck and the bottom of the first remote puck; and
- d) the primary, secondary and tertiary interfaces being the same so that the first remote puck can be disposed on the base with the second remote puck disposed on the first remote puck, and the second remote puck can be disposed on the base with the first remote puck disposed on the second remote puck.

12. The system in accordance with claim 11, wherein each interface further comprises:
- a) an elongated rib extending from the top of each of the base, the first remote puck and the second remote puck;
- b) an elongated channel extending into the bottom of each of the first and second remote pucks; and
- c) the elongated channel of the first and second remote pucks removably receiving the elongated rib of the base or the second or first remote puck.

13. The system in accordance with claim 11, wherein each interface further comprises:
- a) an indentation in the top of each of the base, the first remote puck and the second remote puck, surrounded by a perimeter lip extending upwardly and circumscribing the indentation;
- b) a protrusion extending from the bottom of each of the first and second remote pucks; and
- c) the protrusion of the first and second remote pucks removably receivable in the indentation of the base or the second or first remote puck.

14. The system in accordance with claim 1, wherein each of the base and the first and second remote pucks further comprises a magnet located to magnetically coupled the first or second remote puck to the primary dock of the base, and the first and second remote pucks.

15. The system in accordance with claim 1, further comprising:
- a first remote speaker carried by the first remote puck and operatively coupled to the first transceiver; and
- a second remote speaker carried by the second remote puck and operatively coupled to the second transceiver.

16. The system in accordance with claim 1, further in combination with the cellular phone having the audio socket.

17. A supplemental speaker and microphone system configured for use with a cellular phone having an audio socket, the system comprising:
- a) a base with a top;
- b) a pedestal at a bottom of the base;
- c) a slidable shelf slidably coupled to the pedestal of the base and slidable between a stored position in which at least a portion of the slidable shelf slides into the pedestal of the base, and an extended position in which the at least a portion of the slidable shelf extends from the pedestal of the base configured to receive the cellular phone thereon;
- d) an elongated groove extending into a lateral side of the pedestal of the base;
- e) a bore in the elongated groove;
- f) a cord with a proximal end coupled to the base;
- g) a plug coupled to a distal end of the cord and being capable of mating with the audio socket of the cellular phone;
- h) the cord being removably received in the elongated groove, and the plug being removably received in the bore;
- i) the elongated groove and the cord having substantially the same length;
- j) the elongated groove and the slidable shelf together circumscribing the pedestal of the base in series;
- k) a plug body having the cord and the plug extending therefrom perpendicularly with respect to one another;
- l) a tab extending from the plug body opposite the plug, and extending beyond the elongated groove when the plug is received in the bore;
- m) a speaker carried by the base and operatively coupled to the plug;

n) a primary microphone carried by the base and operatively coupled to the plug;
o) a primary transceiver carried by the base and operatively coupled to the plug;
p) a power source electrically coupled to the speaker and the primary transceiver;
q) a primary dock at the top of the base with a primary electrical connection and an elongated rib extending from the top of the base, the power source being electrically coupled to the primary electrical connection of the primary dock;
r) first and second remote pucks removably disposed on the primary dock on top of the base, and removably disposed with one atop another, a position and an order of the first and second remote pucks on the primary dock of the base being interchangeable;
s) the first and second remote pucks having:
   i) bodies that are substantially the same;
   ii) first and second remote microphones carried by the first and second remote pucks, respectively;
   iii) first and second remote transceivers operatively coupled to the first and second remote microphones, respectively, and carried by the first and second remote pucks, respectively, and capable of communicating with the primary transceiver of the base, and thus the cellular phone;
   iv) rechargeable batteries electrically coupled to the first and second remote transceivers and carried by the first and second remote pucks;
   v) bottoms capable of mating with the primary dock of the base and having a bottom electrical connection capable of electrically connecting to the primary electrical connection of the primary dock when disposed on the primary dock;
   vi) tops with secondary and tertiary docks, respectively, having secondary and tertiary electrical connections, respectively;
   vii) pass-through electrical connections extending from the bottom electrical connections, through the pucks, to the secondary and tertiary electrical connections;
   viii) an elongated rib extending from the top of each of the first remote puck and the second remote puck;
   ix) an elongated channel extending into the bottom of each of the first and second remote pucks;
   x) the elongated channel of the first and second remote pucks separately receiving the elongated rib of the base or the second or first remote puck;
   xi) a primary interface formed between the primary dock of the base and the bottom of the first remote puck, or between the primary dock of the base and the bottom of the second remote puck;
   xii) a secondary interface formed between the secondary dock of the first remote puck and the bottom of the second remote puck;
   xiii) a tertiary interface formed between the tertiary dock of the second remote puck and the bottom of the first remote puck;
   xiv) the primary, secondary and tertiary interfaces being the same so that the first remote puck can be disposed on the base with the second remote puck disposed on the first remote puck, and the second remote puck can be disposed on the base with the first remote puck disposed on the second remote puck;
t) the system having at least two configuration, including:
   i) a use configuration in which:
      A) the plug is capable of being coupled to the audio socket of the cellular phone; and
      B) the first and second remote pucks are removed from the base and located remotely from the base; and
   ii) a charge configuration in which:
      A) the plug is uncoupled to the audio socket of the cellular phone;
      B) the first remote puck is disposed on the primary dock of the base; and
      C) the second remote puck is disposed on the secondary dock of the first remote puck; and
u) the base and the bodies of the first and second remote pucks being horizontally coextensive; the base and the first and second remote pucks having vertical profiles that are the same.

18. The system in accordance with claim 17, further comprising:
lateral alignment members on lateral sides of the base, and the first and second remote pucks, and aligning with one another when the first remote puck is disposed on the base, and the second remote puck is disposed on the first remote puck.

19. The system in accordance with claim 17, wherein each interface further comprises:
a) an indentation in the top of each of the base, the first remote puck and the second remote puck, surrounded by a perimeter lip extending upwardly and circumscribing the indentation;
b) a protrusion extending from the bottom of each of the first and second remote pucks; and
c) the protrusion of the first and second remote pucks removably receivable in the indentation of the base or the second or first remote puck.

20. The system in accordance with claim 17, wherein each of the base and the first and second remote pucks further comprises a magnet located to magnetically coupled the first or second remote puck to the primary dock of the base, and the first and second remote pucks.

21. The system in accordance with claim 17, further comprising:
a first remote speaker carried by the first remote puck and operatively coupled to the first transceiver; and
a second remote speaker carried by the second remote puck and operatively coupled to the second transceiver.

22. The system in accordance with claim 17, further in combination with the cellular phone having the audio socket.

* * * * *

UNITED STATES PATENT AND TRADEMARK OFFICE
CERTIFICATE OF CORRECTION

| | |
|---|---|
| PATENT NO. | : 9,055,156 B1 |
| APPLICATION NO. | : 14/660706 |
| DATED | : June 9, 2015 |
| INVENTOR(S) | : Sumsion et al. |

It is certified that error appears in the above-identified patent and that said Letters Patent is hereby corrected as shown below:

On the title page

Item 72, Inventors section, "Joshual" Kent Barnes should be --Joshua--

Item 73, Assignee section, ZAGG "Intellecutal" Property Holdig Co., Inc. should be --Intellectual--

Signed and Sealed this
Thirteenth Day of October, 2015

Michelle K. Lee
*Director of the United States Patent and Trademark Office*